(12) United States Patent
Cho

(10) Patent No.: US 7,120,461 B2
(45) Date of Patent: Oct. 10, 2006

(54) CAMERA PHONE AND PHOTOGRAPHING METHOD FOR A CAMERA PHONE

(75) Inventor: Yoon Ho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 10/833,319

(22) Filed: Apr. 28, 2004

(65) Prior Publication Data

US 2004/0229646 A1 Nov. 18, 2004

(30) Foreign Application Priority Data

May 15, 2003 (KR) ............... 10-2003-0030978

(51) Int. Cl.
*H04M 1/00* (2006.01)
(52) U.S. Cl. ............... 455/556.1; 455/575.1; 455/344; 455/575.6; 396/373; 396/296; 396/271; 396/374; 396/147; 396/378
(58) Field of Classification Search ............ 396/296, 396/373, 221, 323, 324, 147, 328; 455/556.1, 455/525.1, 349; 348/348
See application file for complete search history.

(56) References Cited

U.S. PATENT DOCUMENTS

| | | | |
|---|---|---|---|
| 1,140,108 A | | 5/1915 | Brown |
| 5,687,408 A | * | 11/1997 | Park ............... 396/271 |
| 5,825,666 A | * | 10/1998 | Freifeld ............ 702/153 |
| 5,873,007 A | | 2/1999 | Suarez |
| 2003/0125008 A1 | * | 7/2003 | Shimamura ........ 455/344 |
| 2004/0174455 A1 | * | 9/2004 | Soga ................. 348/348 |
| 2004/0189849 A1 | * | 9/2004 | Hofer ............. 348/333.03 |

FOREIGN PATENT DOCUMENTS

| | | |
|---|---|---|
| CN | 1220543 | 6/1999 |
| EP | 0963100 | 12/1999 |
| EP | 1267576 | 12/2002 |
| EP | 1298909 | 4/2003 |
| JP | 2000-270242 | 9/2000 |
| JP | 2001-257918 | 9/2001 |

OTHER PUBLICATIONS

CN Office Action dated Nov. 4, 2005.
Korean Office Action (dated Jun. 30, 2005).

* cited by examiner

*Primary Examiner*—Joseph Feild
*Assistant Examiner*—David Nguyen
(74) *Attorney, Agent, or Firm*—Fleshner & Kim, LLP

(57) ABSTRACT

A camera phone and photographing method for a camera phone is provided which allows a camera phone to easily and precisely set a composition of a subject to be photographed. If a standard, preset composition guideline is not appropriate for a particular subject to be photographed, a user may select from a plurality of additional composition guidelines stored in a memory portion of the camera phone. These selections may be altered to select a particular subject by varying characteristics such as type, shape, and color, and may be further altered by adjusting coordinate values of the related composition guideline to further suit the particular subject to be photographed. This camera phone and photographing method provide enhanced precision and ease of use when both photographing with a camera phone and editing using various computer-related tools.

35 Claims, 8 Drawing Sheets

CAMERA PHONE AND PHOTOGRAPHING METHOD FOR A CAMERA PHONE

BACKGROUND OF THE INVENTION

1. Field of the Invention

The invention relates to a camera phone, and more particularly, to a photographing method for a camera phone.

2. Background of the Related Art

In general, a camera is designed to focus on a subject to be photographed and then photograph the subject. Due to advances in technology, the industry has gone from a camera that photographs a subject and records the photographed subject on a film, which may then be developed to produce prints, to a digital camera that records a photographed subject as data in a memory, from which the stored data may be stored, edited, and printed using a PC (Personal Computer).

More recently, a camera phone has been developed. That is, a camera is attached to a mobile communication terminal, or installed in the mobile communication terminal itself In either instance, the camera phone allows a user to easily carry a camera, and photograph a subject anytime and anywhere. Hereinafter, a photographing method for a conventional art camera phone will be described.

In order to set up a composition of a subject to be photographed, a user must first set up a rough composition. In a conventional art camera phone, this is done by moving the camera phone to and fro. The camera photographs the subject displayed on a display unit of the camera phone according to a set up composition, and stores the photographed subject in a memory in the camera phone. Thereafter, the user edits the stored file using a PC (Personal Computer).

However, the conventional art camera phone has at least the following problems. In the conventional art camera phone, it takes a long time to set up a composition of a subject because the user must move the camera phone to and fro in order to set up the composition of the subject. Thus, it is difficult to set up a composition of a subject. Additionally, it is difficult and takes a long time to edit a photograph of a subject, which has been taken with a conventional art camera phone, using, for example, a graphic tool associated with a PC.

A mobile communication terminal in accordance with the conventional art is described in detail in U.S. Pat. No. 6,148,215 issued on Nov. 14, 2000 and U.S. Pat. No. 6,317,614 issued on Nov. 13, 2001. These references are incorporated by reference herein where appropriate for appropriate teachings of additional or alternative details, features and/or technical background.

SUMMARY OF THE INVENTION

An object of the invention is to solve at least one or more of the above problems and/or disadvantages in whole or in part and to provide at least the advantages described hereinafter.

To achieve at least the above objects, in whole or in part, and in accordance with the purposes of the invention, as embodied and broadly described herein, a method is provided in accordance with embodiments of the invention that includes displaying a composition guideline on a display unit of a device and photographing a subject through the displayed composition guideline.

To further achieve at least the above objects, in whole or in part, in accordance with the purposes of the invention, as embodiment and broadly described, a camera according to embodiments of the invention is provided that includes means for displaying a composition guideline on a display unit of the camera and means for photographing a subject through the displayed composition guideline.

To further achieve at least the above objects, in whole or in part, in accordance with the purposes of the invention, as embodiment and broadly described, a camera according to embodiments of the invention is provided that includes a body, a display unit provided on the body and configured to display a composition guideline and a camera unit provided on the main body and configured to photograph a subject through the composition guideline.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A camera phone and a photographing method for a camera phone in accordance with embodiments of the invention will now be described in detail with reference to FIGS. 1–6B. The method and apparatus according to the invention is discussed below with reference to a camera phone. However, the method and apparatus according to the invention may also be applied to other types of photographing and/or reproducing devices.

Figure 1:
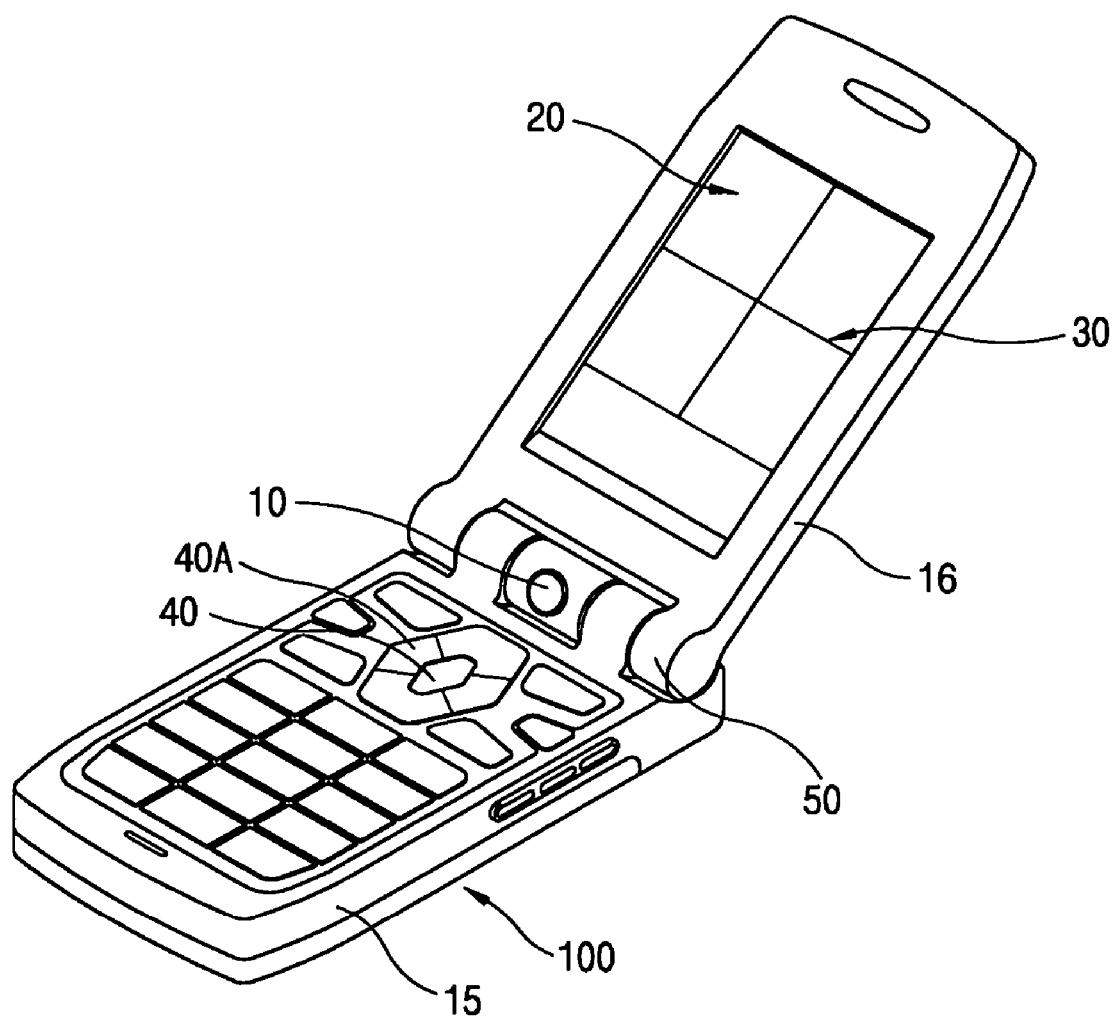
FIG. 1 is a schematic perspective view of a camera phone to which a photographing method for a camera phone in accordance with an embodiment of the invention is applied.

FIG. 1 is a schematic perspective view of a camera phone to which a photographing method for a camera phone in accordance with an embodiment of the invention is applied. The camera phone 100 of FIG. 1 includes a main body 15 and a flap 16. The flap 16 is rotatably attached to the main body 15 by a hinge assembly 50. The camera phone 100 further includes a camera 10 provided on the hinge assembly 50 and a display unit 20 provided on the flap 16.

A composition guideline 30 is provided on the display unit 20 and an input device 40 is provided on the main body 15 of the camera phone 100. A user can select a variety of different composition guidelines. The guidelines may be provided in a menu (not shown) from which the user can then select a desired composition guideline, or a standard composition guideline may be initially displayed which the user may then adjust. For example, the user may adjust a composition guideline 30 displayed on the display unit 20 of the camera phone 100 by using, for example, an input device 40, which may include a direction input device 40A, such as a direction key, provided on the camera phone 10. For example, a user may adjust a type, shape and/or color of the composition guideline using the input device 40, according to user preferences. In this way, a user can precisely and easily photograph a subject through the composition guideline.

Figure 2:
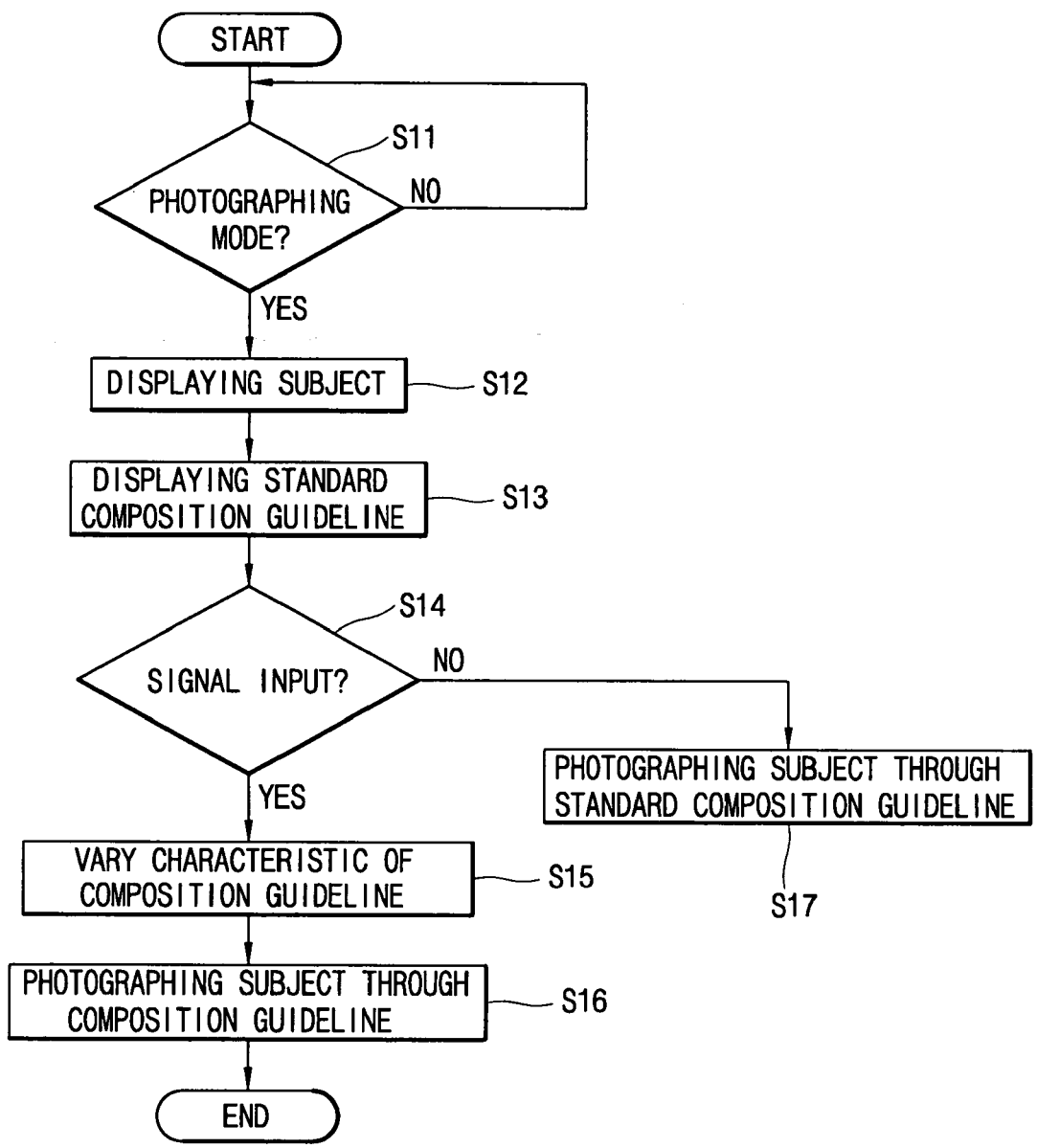
FIG. 2 is a flow chart of a photographing method in accordance with an embodiment of the invention.

FIG. 2 is a flow chart of a photographing method in accordance with an embodiment of the invention. Referring to FIG. 2, when photographing a subject using a camera phone, according to embodiments of the invention, such as the camera phone 100 shown in FIG. 1, the camera phone 100 must be set to a photographing mode, step S11. An image of the subject is then displayed on the display unit 20 of the camera phone 100, step S12. In this embodiment, a pre-stored standard composition guideline, such as the composition guideline 30 shown in FIG. 1, is displayed on the display unit 20, step S13. The subject is then photographed through the composition guideline 30. Assorted characteristics of the composition guideline 30 such as, for example, type, shape, and color, may be varied based on user preferences, step S14.

That is, if a user chooses not to alter any of these characteristics, the subject is photographed using the standard composition guideline, step S17. If, however, a user chooses to vary a characteristic of the composition guideline, for example, using the input device 40, then, for example, the composition guideline is changed, step S15, based on a signal received from the input device 40 of the camera phone 100 in step S14. For example, the user may vary a coordinate value of the composition guideline. The subject is then photographed through the composition guideline, step S16. When a signal is not input via the input device 40 in step S14, a subject is photographed through the standard composition guideline, step S17.

Figure 3A:
FIGS. 3A–3D are exemplary views showing images photographed using a photographing method for a camera phone in accordance with an embodiment of the invention.
Figure 3B:
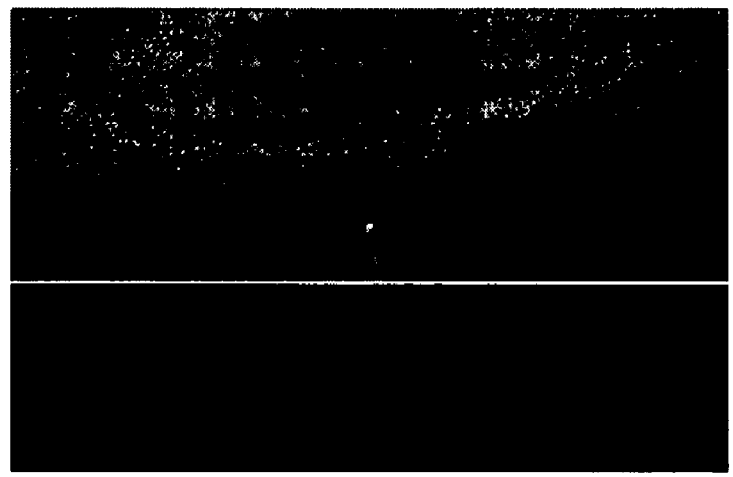
Figure 3C:
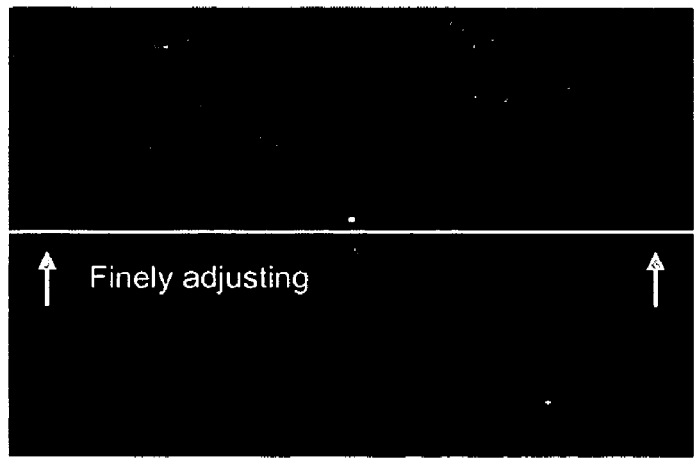
Figure 3D:

As shown in FIG. 3A, when a camera phone according to the embodiments of the invention, such as the camera phone 100 shown in FIG. 1, is in a photographing mode, a subject is displayed on the display unit 20 of the camera phone 100. As shown in FIG. 3B, a standard composition guideline 30 such as, for example, a horizontal composition guideline, as shown, for example, in FIG. 3B, a vertical composition guideline (not shown), or the vertical and horizontal composition guideline shown in FIG. 1, is displayed on the display unit 20 overlaying the displayed subject. Preferably, the composition guideline 30 is displayed on the display unit 20 in accordance with user preferences. When a signal is generated based on user input from the input device 40, a characteristic of the horizontal composition guideline is varied, for example, a coordinate value of the horizontal composition guideline may be varied in upper/lower/right/left directions, as shown, for example, in FIG. 3C. A subject is then photographed through the composition guideline, as shown in FIG. 3D. When there is no signal output from the input device 40, a subject is photographed through the standard composition guideline such as, for example, the horizontal composition guideline shown in FIG. 3B.

Figure 4A:
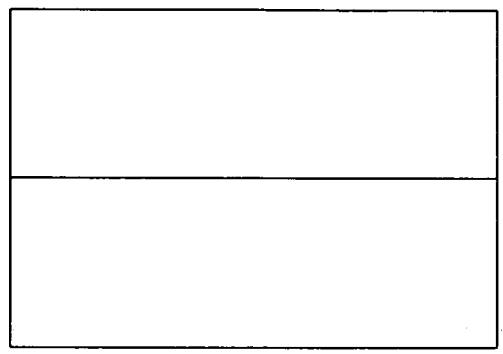
FIGS. 4A–4F are exemplary views showing a variety of composition guidelines in accordance with embodiments of the invention.
Figure 4B:
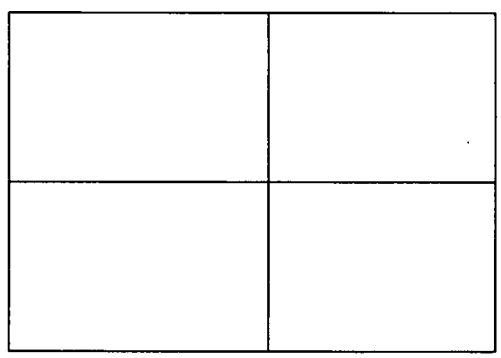
Figure 4C:
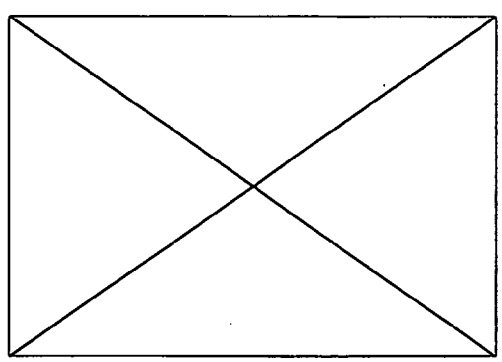
Figure 4D:
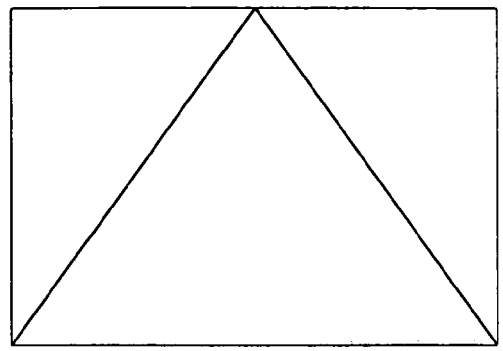
Figure 4E:
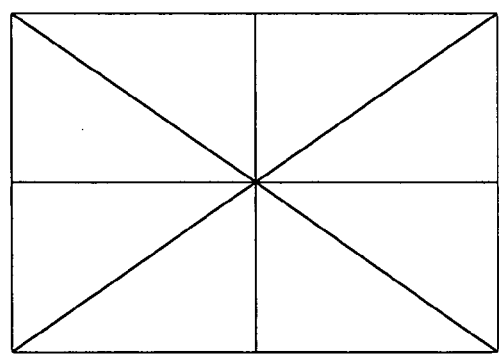
Figure 4F:
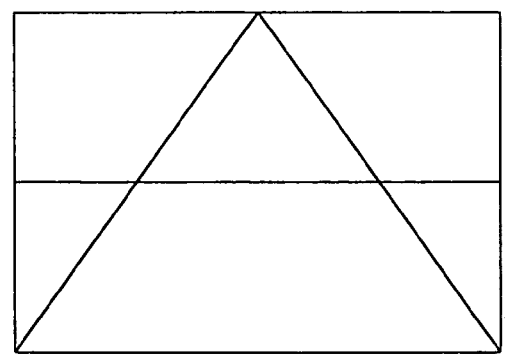

Exemplary types of composition guidelines, which may be selected using a composition guideline selecting menu (not shown) of a photographing menu (not shown) of the camera phone, will now be described with reference to FIGS. 4A–4F. FIG. 4A shows a horizontal composition guideline. FIG. 4B shows a horizontal and vertical composition guideline. FIG. 4C shows a diagonal composition guideline. FIG. 4D shows a triangular composition guideline. FIG. 4E shows a composition guideline formed by combining the horizontal and vertical composition guideline of FIG. 4B and the diagonal composition guideline of FIG. 4C. FIG. 4F shows a composition guideline formed by combining the horizontal composition guideline of FIG. 4A and the triangular composition guideline of FIG. 4D. The composition guidelines shown in FIGS. 4A–4F are merely exemplary in nature, and numerous other useful types and/or combinations could be employed.

A plurality of composition guidelines such as, for example, those shown in FIGS. 4A–4F, may be pre-stored in a memory (not shown) of a camera phone, such as camera phone 100 of FIG. 1. This allows a user to select a specific composition guideline from a composition guideline selecting menu, and then the selected specific composition guideline may be displayed on a display unit of the camera phone 100. For example, if the selected specific composition guideline is a horizontal and vertical composition guideline such as, for example, that shown in FIG. 4B, the selected horizontal and vertical composition guideline is displayed on a display unit of the camera phone. Coordinate values of the composition selected guidelines or other characteristics may be varied based on a signal from an input device of the camera phone.

If it is difficult to photograph the subject through the selected composition guideline, a combined composition guideline such as, for example, one of the combined composition guidelines shown in FIGS. 4E and 4F, may be displayed by combining the appropriate pre-stored composition guidelines. For example, when it is difficult to set up a composition of a subject through a preset standard composition guideline such as, for example, a horizontal and vertical composition guideline, as shown in FIG. 4B, a composition of the subject may be set up using a new composition guideline by combining the various composition guidelines and displaying the combined composition guideline. In addition to a type of composition guideline such as, for example, a solid line, a dotted line, and numerous other possible selections, and a combination of composition guidelines, a user may also select a color and a shape of the composition guideline.

Accordingly, a subject can be photographed through a standard, pre-set composition guideline, and a subject can also be photographed through a composition guideline selected by a user. Additionally, a coordinate value of the composition guideline or other characteristics may be varied based on a signal from an input device according to a user's demand, and a subject can then be photographed through the modified composition guideline.

Figure 5A:
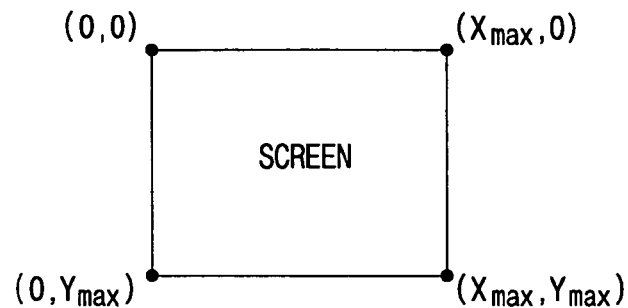
FIGS. 5A–5C are views showing coordinate values of composition guidelines displayed on a display unit of a camera phone in accordance with embodiments of the invention.
Figure 5B:
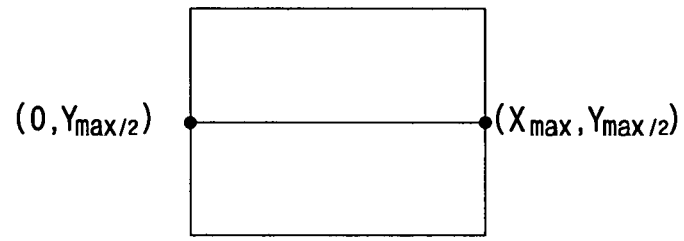
Figure 5C:
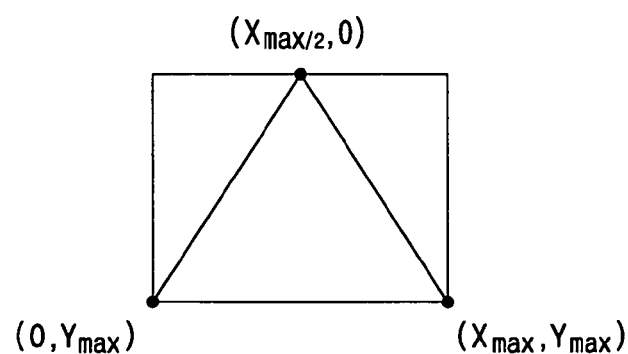

FIGS. 5A–5C show coordinate values of composition guidelines selected by a user and displayed on a display unit of a camera phone, such as camera phone 100 of FIG. 1. More particularly, FIG. 5A shows a coordinate value of an initial composition guideline displayed on a display unit of a camera phone. FIG. 5B shows a coordinate value of a horizontal composition guideline, which is set to $(0, Y_{max/2})$, $(X_{max}, Y_{max/2})$ based on a coordinate value of the initial composition guideline. FIG. 5C shows a coordinate value of a triangular composition guideline, which is set to $(0, Y_{max})$, $(X_{max/2}, 0)$, $(X_{max}, Y_{max})$ based on a coordinate value of the initial composition guideline.

Hereinafter, a method of finely adjusting a coordinate value of a composition guideline selected by a user based on a signal from an input device of a camera phone, such as camera phone 100 in which input device 40 includes a direction input device 40A, will be described with reference to FIGS. 6A–6B, which are exemplary views showing changes in coordinate values of composition guidelines when a user inputs a signal from a direction input device 40A of the camera phone 100, thus causing a coordinate value of the composition guideline to be varied by a predetermined pixel unit based on the signal.

Figure 6A:
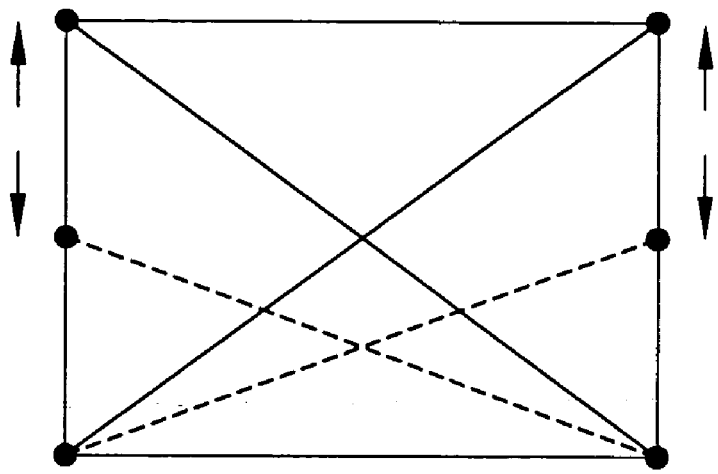
FIGS. 6A–6B are exemplary views showing changes in coordinate values of composition guidelines in accordance with embodiments of the invention.
Figure 6B:
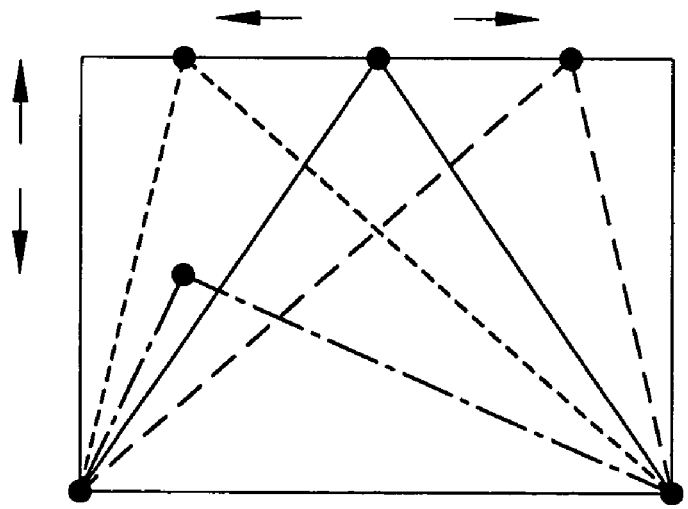

As shown in FIG. 6A, a coordinate value of a diagonal composition guideline selected by a user may be varied by a predetermined pixel unit in upper/lower/right/left directions based on a signal from a direction input device of the camera phone. In this instance, preferably, a coordinate value of the composition guideline is preferably varied in a four-pixel unit. As shown in FIG. 6B, a coordinate value of a triangular composition guideline selected by a user may be varied by a predetermined pixel unit in upper/lower/right/left directions. The variations shown in FIGS. 6A–6B are merely exemplary in nature, and it is understood that numerous combinations of composition guidelines and variations in coordinate values may be effectively employed.

Accordingly, when an appropriate composition guideline for a particular subject is not pre-stored in a memory of the camera phone, a user may vary a type, a shape, a color, and a coordinate value of a pre-stored composition guideline at will, to thereby display a new composition guideline and photograph a subject through the displayed composition guideline, thus greatly increasing the number of composition guidelines available to a user and greatly enhancing the utility and flexibility of the camera phone.

The camera phone and method according to embodiments of the invention provide at least the following advantages.

A method for a camera phone according to the embodiments of the invention allows the camera phone to easily and precisely set up a composition of a subject to be photographed.

Further, the method according to the embodiments of the invention provides for easily photographing a subject using a composition guideline.

Additionally, the photographing method for a camera phone according to the embodiments of the invention allows the camera phone to precisely and easily photograph a subject by displaying a guideline on a display unit of a camera phone. That is, using a photographing method for a camera phone in accordance with embodiments of the invention as broadly described herein, a subject may be precisely and easily photographed using a composition guideline which is appropriate for a particular subject by displaying a composition guideline in various forms on a display unit of a camera phone. Additionally, a picture of a subject photographed through the composition guideline may be easily and quickly edited using a graphic tool associated with a PC because, when the subject is photographed through the appropriate composition guideline, a composition of a picture of the subject is precisely set up, thus allowing the picture of a subject to be easily and quickly edited.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A photographing method, comprising:
    selecting a standard composition guideline from a plurality of standard composition guidelines and displaying the selected standard composition guideline on a display unit of a device;
    adjusting a coordinate value of the composition guideline to display a custom composition guideline which accommodates a subject to be photographed based on a signal from an input device of the device if the standard composition guideline does not accommodate the subject; and
    photographing the subject through the displayed composition guideline.

2. The method of claim 1, wherein the standard and custom composition guidelines are displayed on the display unit when the device is in a photographing mode.

3. The method of claim 2, further comprising varying a type of the displayed composition guideline based on a user's preference.

4. The method of claim 2, further comprising varying a shape of the displayed composition guideline based on a user's preference.

5. The method of claim 2, further comprising varying a color of the displayed composition guideline based on a user's preference.

6. The method of claim 2, further comprising varying a type, shape, and/or color of the displayed composition guideline based on a user's preference.

7. The method of claim 1, wherein the plurality of standard composition guidelines are pre-stored in a memory portion of the device.

8. The method of claim 1, wherein the plurality of standard composition guidelines comprises at least a horizontal composition guideline, a horizontal and vertical composition guideline, a diagonal guideline, and a triangular composition guideline.

9. The method of claim 1, wherein selecting a standard composition guideline and displaying the selected standard composition guideline on a display unit of a device further comprises replacing the selected standard composition guideline with another of the plurality of standard composition guidelines based on a user's preference.

10. The method of claim 1, wherein adjusting a coordinate value based on a signal from an input device is done through user manipulation of the input device.

11. The method of claim 10, wherein the input device comprises a direction input device.

12. The method of claim 11, wherein the direction input device comprises a key input device.

13. The method of claim 1, wherein the coordinate value of the composition guideline is adjusted by a predetermined pixel unit.

14. The method of claim 1, wherein the device comprises a camera.

15. The method of claim 1, wherein the device comprises a camera phone.

16. The method of claim 6, wherein varying a type, shape, and/or color of the composition guideline comprises setting a type, a shape, and a color of the displayed composition guideline based on a signal from the input device.

17. The method of claim 9, wherein selecting a standard composition guideline and replacing the standard composition guideline is done based on a signal from the input device.

18. The method of claim 1, wherein the coordinate value of the displayed composition guideline is varied by a predetermined pixel unit.

19. The method of claim 17, further comprising displaying a preset composition guideline on the display unit and photographing the subject through the preset composition guideline when a signal is not received from the input device.

20. An apparatus, comprising:
   means for selecting a standard composition guideline from a plurality of standard composition guidelines and displaying the selected standard composition guideline on a display unit of the apparatus;
   means for adjusting a coordinate value of the composition guideline to display a custom composition guideline which accommodates a subject to be photographed based on a signal from an input device of the device if the standard composition guideline does not accommodate the subject; and
   means for photographing the subject through the displayed composition guideline.

21. The apparatus of claim 20, further comprising means for varying the displayed composition guideline based on a user's preference.

22. The apparatus of claim 21, wherein the means for varying comprises an input device.

23. The apparatus of claim 22, wherein the means for varying is configured to vary at least one of a shape, a color, and a type of the composition guideline based on a signal from the input device.

24. The apparatus of claim 21, wherein the means for varying comprises direction input means for varying a coordinate value of the composition guideline.

25. The apparatus of claim 20, further comprising means for storing at least one composition guideline for selection by a user.

26. The apparatus of claim 20, wherein the apparatus comprises a camera.

27. The apparatus of claim 20, wherein the apparatus comprises a camera phone.

28. A device, comprising:
   a body;
   a display unit provided on the body and configured to display a composition guideline, wherein a coordinate value of the composition guideline may be varied through user manipulation of an input device of the device; and
   a camera unit provided on the body and configured to photograph a subject through the displayed composition guideline.

29. The device of claim 28, wherein the input device is configured to vary at least one of a shape, a color, a type, and a coordinate value of the composition guideline.

30. The device of claim 29, wherein the input device comprises a direction input device.

31. The device of claim 30, wherein the direction input device comprises a key input.

32. The device of claim 28, further comprising a memory device configured to store at least one composition guideline.

33. The device of claim 28, wherein the device comprises a camera.

34. The device of claim 28, wherein the device comprises a camera phone.

35. The device of claim 29, wherein the input device is configured to vary at least one of a shape, a color, a type, and a coordinate value of the composition guideline based on a user's preference.

* * * * *